US012811528B2

(12) United States Patent

Kozlowski et al.

(10) Patent No.: US 12,811,528 B2
(45) Date of Patent: Nov. 24, 2026

(54) TRANSFORMER DEVICE AND SYNCHRONOUS MACHINE

(71) Applicant: Mahle International GmbH, Suttgart (DE)

(72) Inventors: Peter Kozlowski, Stuttgart (DE); Penyo Topalov, Stuttgart (DE); Philipp Zimmerschied, Stuttgart (DE)

(73) Assignee: Mahle International GmbH (DE)

( * ) Notice: Subject to any disclaimer, the term of this patent is extended or adjusted under 35 U.S.C. 154(b) by 168 days.

(21) Appl. No.: 18/708,198

(22) PCT Filed: Oct. 18, 2022

(86) PCT No.: PCT/EP2022/078936
§ 371 (c)(1),
(2) Date: May 7, 2024

(87) PCT Pub. No.: WO2023/078669
PCT Pub. Date: May 11, 2023

(65) Prior Publication Data

US 2024/0429847 A1 Dec. 26, 2024

(30) Foreign Application Priority Data

Nov. 8, 2021 (DE) ..................... 10 2021 212 549.2

(51) Int. Cl.
*H02P 1/04* (2006.01)
*H02J 50/12* (2016.01)
(Continued)

(52) U.S. Cl.
CPC .............. *H02P 25/03* (2016.02); *H02J 50/12* (2016.02); *H02J 50/80* (2016.02); *H02P 27/08* (2013.01)

(58) Field of Classification Search
CPC ........ H02P 25/03; H02P 9/009; H02P 29/024; H02P 6/16; H02P 13/00; H02P 1/26; H02P 25/18; H02P 27/08
See application file for complete search history.

(56) References Cited

U.S. PATENT DOCUMENTS 9,344,157 B2 5/2016 Muller
11,101,696 B2 8/2021 Hosotani
(Continued)

FOREIGN PATENT DOCUMENTS

DE 112017002380 T5 1/2019
DE 102020207000 A1 12/2020
(Continued)

OTHER PUBLICATIONS

Maier, D. ; Kurz, J. ; Parspour, N.: Contactless Energy Transfer for Inductive Electrically Excited Synchronous Machines. In: 2019 IEEE Pels Workshop on Emerging Technologies: Wireless Power Transfer (WoW), 2019, S. 191-195. doi: 10.1109/WoW45936.2019.9030682.
(Continued)

*Primary Examiner* — Karen Masih
(74) *Attorney, Agent, or Firm* — Fishman Stewart PLLC

(57) ABSTRACT

A transformer device for inductive transmission of electrical energy between a DC voltage source and a consumer may include a primary side and a secondary side. The primary side may include the DC voltage source, an inverter, a primary compensation device, a primary transformer coil, and a primary communications device. The secondary side may include a secondary transformer coil, a secondary compensation device, a rectifier, a secondary communications device, and the consumer. The secondary communications device may be configured to encode secondary-side data according to a predetermined code, may be coupled to the secondary-side compensation device, and may be con-
(Continued)

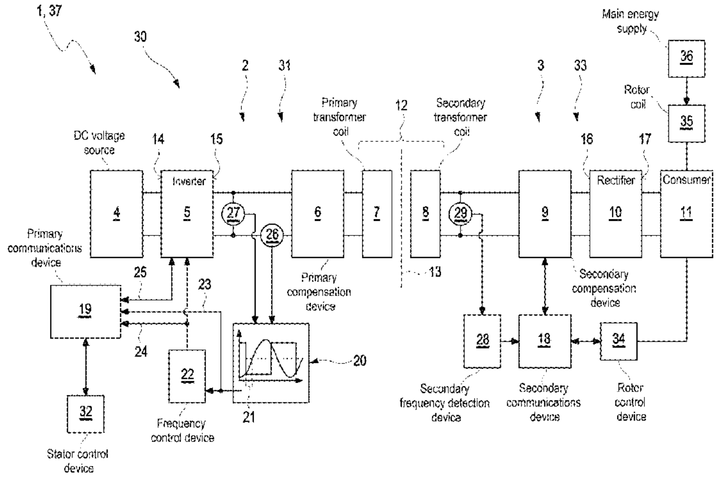

figured to control the secondary communications device depending on the encoded data for changing a secondary-side resonant frequency. The primary communications device may be configured to monitor a primary-side parameter that correlates to the secondary-side resonant frequency, recognize the encoded data, and decode the encoded data according to the code.

30 Claims, 1 Drawing Sheet

(51) Int. Cl.

| | |
|---|---|
| ***H02J 50/80*** | (2016.01) |
| ***H02P 25/03*** | (2016.01) |
| ***H02P 27/08*** | (2006.01) |

(56) References Cited

U.S. PATENT DOCUMENTS

| | | | | |
|---|---|---|---|---|
| 11,870,307 | B2 | 1/2024 | Maier | |
| 2013/0082516 | A1* | 4/2013 | Yamaguchi ............ | H04B 3/548 307/1 |
| 2016/0043562 | A1 | 2/2016 | Lisi | |

FOREIGN PATENT DOCUMENTS

| | | | | | |
|---|---|---|---|---|---|
| EP | 2869316 | A1 | | 5/2015 | |
| KR | 20190003407 | A | * | 1/2019 | ............. H02J 50/12 |
| WO | 2010003474 | A1 | | 1/2010 | |
| WO | 2012109137 | A2 | | 8/2012 | |

OTHER PUBLICATIONS

Maier, M. ; Maier, D. ; Zimmer, M. ; Parspour, N.: A Novel Self Oscillating Power Electronics for Contactless Energy Transfer and Frequency Shift Keying Modulation. In: 2016 International Symposium on Power Electronics, Electrical Drives, Automation and Motion (SPEEDAM), 2016, S. 67-72. doi: 10.1109/SPEEDAM.2016.7525952.

Frequenzumtastung. In: Wikipedia, Die freie Enzyklopädie. Bearbeitungsstand: Jul. 10, 2021. URL: https://de.wikipedia.org/w/index.php?title=Frequenzumtastung&oldid=216195588 [abgerufen am Sep. 9, 2022].

India Office Action, IN202417036451, dated Jun. 30, 2026.

* cited by examiner

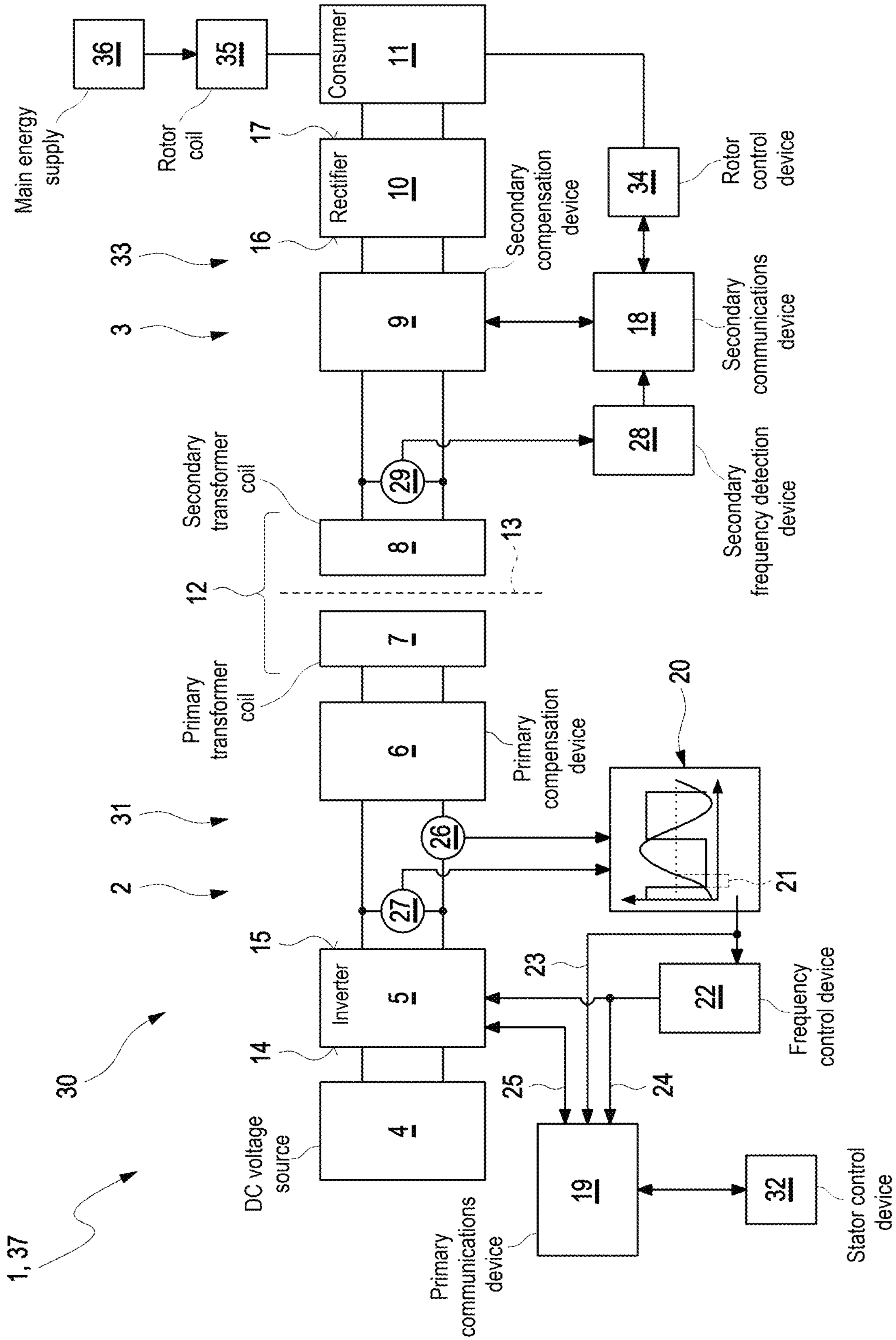
Main energy supply
36
35
Rotor coil
Consumer
11
17
Rectifier
10
16
33
Secondary compensation device
34
Rotor control device
3
9
18
Secondary communications device
Secondary transformer coil
29
28
Secondary frequency detection device
8
13
12
7
Primary transformer coil
6
Primary compensation device
20
31
26
2
27
21
15
Inverter
5
23
22
Frequency control device
30
14
25
24
4
DC voltage source
19
Primary communications device
32
Stator control device
1, 37

TRANSFORMER DEVICE AND SYNCHRONOUS MACHINE

CROSS-REFERENCE TO RELATED APPLICATIONS

This application claims priority to International Patent Application No. PCT/EP2022/078936, filed on Oct. 18, 2022, and German Patent Application No. DE 10 2021 212 549.2, filed on Nov. 8, 2021, the contents of both of which are hereby incorporated by reference in their entirety.

TECHNICAL FIELD

The invention relates to a transformer device for inductively transmitting electrical energy between a DC voltage source and an electrical consumer, in particular an inductively electrically excited synchronous machine. Further, the invention relates to an inductively electrically excited synchronous machine equipped with such a transformer device. In addition, the invention relates to a method for data transmission between a secondary side of a transformer device, which serves for inductively transmitting electrical energy from a DC voltage source to a consumer, and a primary side of the transformer device.

BACKGROUND

A synchronous machine is a rotating electric machine in which during the operation a rotor rotates synchronously with a rotating field of a stator. Generally, a synchronous machine can be operated as motor or generator. In the case of an electrically excited or externally excited synchronous machine, a magnetic field is additionally electrically generated on the rotor. For this purpose, at least one rotor coil is employed, which for generating the rotor-side magnetic field, has to be supplied with electrical energy, in particular in the form of direct current. In the case of an inductively electrically excited synchronous machine, the electrical energy supply to the respective rotor coil takes place in a brushless manner, namely by means of induction. An inductively electrically excited synchronous machine corresponds to a brushless externally excited electric synchronous machine.

Such a synchronous machine is known for example from EP 2 869 316 A1 and includes a rotor, which comprises a rotor coil for generating a magnetic rotor field and a secondary transformer coil for supplying the rotor coil with electrical energy. In addition, the synchronous machine comprises a stator on which the rotor is rotatably mounted about an axis of rotation, and which comprises a stator coil for generating a magnetic stator field and a primary transformer coil for inductively transmitting electrical energy to the secondary transformer coil. The primary and secondary transformer coils form a rotary transformer and are part of a transformer device for inductively transmitting electrical energy.

In such an inductively electrically excited synchronous machine there is a need for transmitting data, such as for example control commands, from the stator to the rotor, for example in order to control or regulate the energization of the rotor coil. For this purpose, a communication path is provided in the synchronous machine known from the abovementioned EP 2 869 316 A1, which makes possible the desired data transmission from the stator to the rotor. Here, a further additional rotary transformer is employed, the primary coil of which on the stator side is coupled to a modulator or driver and the secondary coil of which is coupled on the rotor side to a demodulator. Thus, inductive signal transmission or data transmission from the stator to the rotor is made possible. The provision of such an additional rotating transformer involves comparatively major expenditure. Apart from this, the signal transmission via such an additional rotary transformer in the vicinity of an inductively electrically excited synchronous machine is exposed to relatively major interferences. Similar applies also to other ways of wireless communication, such as for example a radial link. This applies all the more to synchronous machines of higher output.

In addition to this, there is a need in modern inductively electrically excited synchronous machines for a reverse data transmission, i.e. for a transmission of data from the rotor to the stator. For example, the current actually flowing in the rotor coil is of increasing importance for a stator-side control device in order to be able to control the synchronous machine. Conventional communications paths, as shown on the abovementioned example, are expensive and susceptible to interference.

The communication between primary side and secondary side is not only of interest with a rotating transformer or rotary transformer such as is present for example in an inductively electrically excited synchronous machine, but basically in any transformer device for transmitting electrical energy between a DC voltage source and an electrical consumer. Such transformer devices can include rotating transformers as well as stationary transformers. For example, an inductively operating charging device can be equipped with such a transformer device.

SUMMARY

The present invention deals with the problem of showing a way for a transformer device for the inductive transmission of electrical energy between a DC voltage source and a consumer, and in particular for an inductively electrically excited synchronous machine equipped with such, which makes possible data transmission at least from the secondary side to the primary side and which can be realised with comparatively low expenditure and which is characterised in particular by a reduced susceptibility to interference, wherein in addition an impairment of the energy transmission between primary side and secondary side is to be avoided.

According to the invention, this problem is solved through the subject matter of the independent claim(s). Advantageous embodiments are the subject matter of the dependent claim(s).

The invention is based on the general idea of transmitting the secondary-side data by means of frequency modulation, wherein for this purpose the secondary-side resonant frequency is modulated. Since within the transformer device the primary side and the secondary side form an electromagnetically coupled oscillating system, a change of the secondary resonant frequency affects the entire oscillating system and thus also the primary side. Thus, there exists at least one primary-side parameter which correlates to the secondary-side resonant frequency. According to the invention, this primary parameter is now monitored on the primary side, by way of which it is possible to demodulate data modulated onto the secondary resonant frequency on the primary side from the primary parameter correlating to the secondary resonant frequency.

In detail, the invention proposes a transformer device which comprises a primary side and a secondary side. The primary side comprises a DC voltage source, an inverter, a primary compensation device and a primary transformer coil. The secondary side comprises a secondary transformer coil, a secondary compensation device, a rectifier and an electrical consumer. In the present context, the indefinite articles "a, an" are to be understood generically, namely as "at least one". Accordingly, multiple DC voltage sources can be present for example on the primary side. Analogously thereto, multiple consumers can also be present for example on the secondary side. Apart from this, the terms "primary" and "primary-side" are to be understood identically, just like the terms "secondary" and "secondary-side".

The electrical consumer connected to the rectifier is practically equipped in such a manner that it is to be operated with direct current or DC voltage.

The inverter is connected with its input side to the DC voltage source and with its output side is connected, via the primary compensation device, to the primary transformer coil. The primary compensation device is matched in the usual manner to the primary transformer coil so that reactive components in the primary-side alternating current are compensated. Further, the primary compensation device and the primary transformer coil form a primary resonant circuit which has a primary resonant frequency. The inverter is pulse-modulated for an optimal energy transmission with the primary resonant frequency, so that the AC voltage generated by the inverter possesses this primary resonant frequency.

Further, the rectifier is connected with its input side, via the secondary compensation device, to the secondary transformer coil and with its output side, is connected to the consumer. Here, too, the secondary compensation device and the secondary transformer coil are matched to one another so that the reactive components in the secondary-side alternating current can be compensated. Likewise, the secondary compensation device and the secondary transformer coil form a secondary resonant circuit, which possesses a secondary resonant frequency. For an optimal energy transmission, the secondary resonant frequency is usually selected equal to the primary resonant frequency. The primary and secondary resonant frequencies define the natural resonant frequency of the oscillating system formed by the transformer device.

According to the invention it is now proposed to configure the secondary compensation device variably so that the compensation with respect to the secondary-side resonant frequency can be changed. As explained above, the oscillating system can be detuned by changing the secondary-side resonant frequency, which has an effect on the primary side and can be detected there by way of at least one primary-side parameter, which correspondingly correlates to the secondary-side resonant frequency.

For the desired communication of the secondary side with the primary side, the secondary side can comprise a secondary communications device, which encodes secondary-side data according to a predetermined code and which is coupled to the secondary compensation device and controls the same dependent on the encoded data for changing the secondary resonant frequency. The control takes place such that a chronological sequence of changed secondary resonant frequencies represents the encoded data. Thus, the data as frequency modulation are modulated onto or into or encoded on the secondary resonant frequency. The primary side is now equipped with a primary communications device which monitors a measurable primary-side parameter, which correlates to the secondary-side resonant frequency and in the process recognises the encoded data and decodes these according to the code. Because of the correlation between the secondary-side resonant frequency and the primary-side parameter, the frequency modulation of the secondary resonant frequency is transmitted via the transformer coils from the secondary side to the primary side where it is detectable as frequency modulation in the primary-side parameter, which can then be demodulated or decoded in the usual manner.

With the transformer device according to the invention introduced here, the secondary side thus communicates via the energy transmission path, namely via the oscillating system from primary and secondary transformer coil, with the primary side so that an additional transmission path, for example in the form of an additional transformer is not required. It has been shown that even a comparatively minor change of the secondary resonant frequency is sufficient in order to significantly change the primary parameter, which makes possible a safe signal transmission. Further it has been shown that such minor detuning of the oscillating system does not result in any substantial impairment of the energy transmission between primary side and secondary side. Further, this frequency modulation is largely insensitive to the other usual interference influences to which the transformer device is exposed, in particular within the electromagnetic oscillations of the oscillating system of the transformer device.

In an advantageous embodiment, the primary side can comprise a phase measuring device, which determines a phase shift between alternating current and AC voltage on the primary side, e.g. on the inverter, wherein the primary communications device is coupled to the phase measuring device and monitors the phase shift as primary-side parameter, which correlates to the secondary-side resonant frequency. This embodiment is based on the realisation that a change of the secondary-side resonant frequency on the primary side results in a phase shift between voltage and current. The measurable phase shift generally correlates to the deviation between the control frequency of the inverter and the natural resonant frequency of the system, which in turn is obtained by the resonant frequencies of the primary side and of the secondary side. Finally, this phase shift thereby correlates to the secondary resonant frequency, so that the frequency modulation of the secondary resonant frequency results in a frequency modulation of the primary-side phase shift correlating thereto. Thus, the data modulated via the secondary resonant frequency into the oscillating system can be demodulated out of the phase shift on the primary side. According to a preferred embodiment, the primary communications device monitors in particular the chronological sequence of the phase shift and recognises and decodes according to the code the data encoded in the phase shift.

In another embodiment, the primary side can comprise a frequency control device which corrects a phase shift between current and voltage on the primary side by adjusting the frequency in the primary-side AC voltage or in the primary-side alternating current. The frequency in the primary-side AC voltage or in the primary-side alternating current is predetermined by the inverter. By coupling the frequency control device to the inverter, the inverter can be controlled for adjusting the frequency such that a determined phase shift is corrected, so that as a consequence current and voltage again oscillate synchronously on the primary side. Such a frequency control device can be provided for example in order to adapt the oscillating system to changing operating conditions such as for example the temperature and to ageing manifestations of the electronic components.

The primary communications device can now be coupled to the frequency control device and/or to the inverter and monitor the adjustment of the frequency in the primary-side AC voltage or in the primary-side alternating current as primary-side parameter, which correlates to the secondary resonant frequency. As explained above, a change of the secondary resonant frequency results in that on the primary side a phase shift between current and voltage materialises. Accordingly, the phase shift correlates to the secondary resonant frequency. Such a phase shift is corrected by the frequency control device. This adjustment of the frequency in the primary-side AC voltage or in the primary-side alternating current accordingly correlates to the phase shift and accordingly to the secondary resonant frequency. According to an advantageous embodiment, the primary communications device monitors in particular the chronological sequence of the mentioned frequency adjustments and recognises and decodes according to the code the data encoded in the frequency adjustment.

The adjustment of the frequency in the primary-side AC voltage or in the primary-side alternating current can be represented by the control commands of the frequency control device to the inverter or by the pulse modulation changed by the inverter based on the control commands and also by the ultimately measurable frequency in the primary-side AC voltage or in the primary-side alternating current. The frequency adjustment, the associated control signals and the pulse modulation or control frequency represent primary-side measurable parameters which correlate to the secondary resonant frequency. Accordingly, the primary communications device can be coupled to the frequency control device for monitoring the control signals or to the inverter for monitoring the pulse modulation or alternatively to a frequency measuring device for measuring the frequency in the primary-side AC voltage or in the primary-side alternating current for monitoring the said frequency. According to an advantageous embodiment, the primary communications device accordingly monitors in particular the chronological sequence of the mentioned control signals or the mentioned pulse modulation or the mentioned frequency and recognises and decodes according to the code the data encoded in the control signals or in the pulse modulation or in the frequency.

The secondary transformer coil has an impedance. The secondary compensation device matched thereto has a capacitance fitting thereto. Thus, the secondary transformer coil and the secondary compensation device form a resonant circuit which has a resonant frequency which here is referred to as secondary resonant frequency. According to a preferred embodiment, it can now be provided that the secondary compensation device comprises a variable capacitor, in which at least two different capacitances can be electronically adjusted. Alternatively to this, the secondary compensation device can comprise at least two invariable capacitors, which are connected in parallel and of which the one is electronically activatable and de-activatable while the other one is permanently active. For example, the secondary compensation device can comprise an electronic switch, such as for example a transistor, which is coupled to the secondary communications device so that the secondary communications device via the said switch activates and deactivates the switchable capacitor in order to thus change the secondary resonant frequency. By changing the capacitance of the secondary compensation device, the resonant frequency of the resonant circuit of compensation device and transformer coil changes.

According to an advantageous embodiment, the code is a binary code. The secondary compensation device is then configured so that two different secondary-side resonant frequencies can thereby be adjusted. The binary code is formed with zeros "0" and ones "1". The one resonant frequency then defines the "0" of the binary code while the other resonant frequency then forms the "1" of the binary code. With the help of a binary modulation, the desired data can be securely transmitted.

Another advantageous embodiment proposes that the secondary compensation device is configured so that it can change the secondary resonant frequency only in a range smaller than 1%. It is likewise conceivable that the secondary resonant frequency can only be changed in a range smaller than 1%. Thus it is ensured that the detuning of the oscillating system is so small that the signal transmission has no or no substantial effect on the energy transmission.

The secondary-side data can contain or represent for example values for the secondary-side current and/or for the secondary-side voltage and/or for a temperature of at least one secondary-side component.

In another advantageous embodiment, the secondary side can comprise a secondary-side frequency capturing device for capturing the current frequency in the secondary-side AC voltage or in the secondary-side alternating current. In the following, only the current frequency is considered to simplify representation but it is clear that similar also applies to the voltage frequency. The primary-side communications device can now be configured so that it encodes the primary-side data according to a predetermined code. Further, the primary-side communications device can be coupled to the inverter and control the same depending on the encoded data for changing the pulse modulation or the control frequency of the inverter and thus the frequency of the primary-side AC voltage, so that a chronological sequence of changed frequencies in the primary-side AC voltage represents the encoded data. The secondary-side communications device can now be coupled to the secondary-side frequency detection device and monitor the frequency in the secondary-side AC voltage and thereby recognise the encoded data and decode these according to the code. The frequency in the secondary-side AC voltage always corresponds to the frequency in the primary-side AC voltage. When, via a suitable control of the inverter the pulse modulation and thus the frequency in the primary-side AC voltage are changed, a corresponding change of the frequency thereby occurs quasi-simultaneously in the secondary-side AC voltage. Usually, the pulse modulation of the inverter takes place with respect to the resonant frequency of the oscillating system, which is known to the secondary-side communications device, so that the same can recognise and evaluate any deviation from this resonant frequency.

Through this embodiment, a communications path in the opposite direction is realised, i.e. from the primary side to the secondary side. Thus, control commands or the like can be transmitted for example. Here, the oscillating system of the transformer device provided for the energy transmission is also utilised for the data transmission. The equipment expenditure for realising such a communication is correspondingly low.

An inductively electrically excited synchronous machine according to the invention comprises a stator, a rotor and a transformer device of the type described above. The stator comprises a stator control device. The rotor is rotatably mounted about an axis of rotation on the stator and comprises a rotor control device arranged thereon. The primary side of the transformer device is arranged on the stator while the secondary side of the transformer device is arranged on the rotor. Further, the primary-side communications device is electrically connected to the stator control device while the secondary-side communications device is electrically connected to the rotor control device. With the help of the transformer device, a communication between the rotor control device and the stator control device is thus made possible. Thus, the rotor control device for example can transmit the active current or other relevant data of the rotor via the transformer device to the stator control device, which can then utilise these in particular for controlling and regulating the synchronous machine. The synchronous machine is preferably configured as drive motor or traction motor for a motor vehicle, which can consume in particular electrical power of 100 kW to 240 kW, preferably of 120 kW to 160 kW, particularly preferably of approximately 140 kW.

According to an advantageous embodiment, the consumer of the transformer device can comprise a rotor coil for generating a magnetic rotor field. The transformer device in this case serves for supplying the rotor coil with electrical energy and can at the same time also supply the rotor control device with electrical energy.

In an alternative embodiment, the rotor comprises a rotor coil and the synchronous machine is equipped with a main energy supply for the inductive transmission of electrical energy to the rotor coil. In this case, the transformer device of the type described above forms within the synchronous machine an auxiliary energy supply, which inductively transmits the electrical energy to the rotor control device. In this case, the consumer comprises the rotor control device or is formed by the same. In this embodiment of the synchronous machine, the auxiliary energy transmission path, which supplies the rotor control device with electrical energy, is utilised for data transmission. The main energy transmission path, which supplies the rotor coil with electrical energy, remains unaffected by this. Because of the major differences in the voltage level on the rotor coil on the one hand and on the rotor control device on the other hand it can be practical and more cost-effective, to provide for the rotor control device a separate auxiliary energy supply, which is then practically formed by the transformer device of the type described above and at the same time can be utilised for reliable or secure data transmission.

A method for data transmission according to the invention between a secondary side of a transformer device which serves for the inductive transmission of electrical energy from a DC voltage source to a consumer, and a primary side of the transformer device, is characterised in that data, which are to be transmitted from the secondary side to the primary side, are encoded on the secondary side by modulation of a secondary-side resonant frequency and in that a primary-side parameter, which correlates to the secondary-side resonant frequency, is monitored and decoded on the primary side. The modulation of the secondary-side resonant frequency results in a detuning of the oscillating system and on the primary side results in a phase shift between current and voltage. This phase shift thus has the same modulation as the secondary-side resonant frequency and can accordingly be utilised for demodulating the data. Provided that on the primary side a frequency control device is present, which corrects a phase shift between voltage and current by adjusting the pulse modulation or frequency in the primary-side AC voltage, this control activity of the frequency control device can also be utilised for recognising the encoded signals, just like the changes of the pulse modulation of the inverter and the frequency changes themselves in the primary-side AC voltage.

According to an advantageous further development, it can be additionally provided with the method that data, which are to be transmitted from the primary side to the secondary side, are encoded on the primary side by modulation of the frequency of the primary-side AC voltage or of the primary-side alternating current, wherein on the secondary side the frequency of the secondary-side AC voltage or of the secondary-side alternating current is monitored and decoded. In the following, only the current frequency is discussed again for simplified presentation, while it is clear that similar applies also to the voltage frequency. Here, too, the communication is carried out in the opposite direction, i.e. from the primary side to the secondary side. In this case, the realisation is utilised that the AC voltage on the secondary side oscillates with the same frequency as the AC voltage on the primary side. A modulation of the frequency of the primary AC voltage, which can be brought about for example through a corresponding modulation of the pulse modulation of the inverter, then results in a corresponding modulation of the frequency in the secondary-side AC voltage, which can then be detected and evaluated in a suitable manner in order to decode the data.

The different embodiments introduced above regarding the transformer device and regarding the synchronous machine can also be realised in a corresponding manner with the method introduced here, wherein the relevant device features are then realised by method features corresponding therewith.

Further important features and advantages of the invention are obtained from the subclaims, from the drawing and from the associated FIGURE description by way of the drawing.

It is to be understood that the features mentioned above and still to be explained in the following cannot only be used in the respective combination stated but also in other combinations or by themselves without leaving the scope of the invention. Parts named above and still to be named in the following of a higher unit, such as for example an installation, a device or an arrangement which is designated separately, can form separate components of this unit or be integral regions or portions of this unit, even if this is shown differently in the drawing.

Preferred exemplary embodiments of the invention are shown in the drawing and are explained in more detail in the following description, wherein same reference numbers relate to same or similar or functionally same components.

BRIEF DESCRIPTION OF THE DRAWINGS

The only FIG. 1 shows a highly simplified schematic representation of a transformer device in the manner of a circuit diagram.

DETAILED DESCRIPTION

According to FIG. 1, a transformer device 1 includes a primary side 2 and a secondary side 3. The primary side 2 comprises a DC voltage source 4, an inverter 5, a primary compensation device 6 and a primary transformer coil 7. The secondary side 3 comprises a secondary transformer coil 8, a secondary compensation device 9, a rectifier 10 and a consumer 11. The primary transformer coil 7 and the secondary transformer coil 8 form a transformer 12. The transformer 12 can be a stationary transformer 12. Preferably, the transformer 12 is a rotating transformer 12 or rotary transformer 12, in which the primary transformer coil 7 is stationary while the secondary transformer coil 8 rotates.

Practically, the primary transformer coil 7 and the secondary transformer coil 8 are galvanically isolated from one another. A suitable galvanic separation is indicated in FIG. 1 by an interrupted line and designated 13.

The transformer device 1 serves for the inductive transmission of electrical energy between the primary side 2 and the secondary side 3 and in particular between the DC voltage source 4 and the consumer 11. For this purpose, the inverter 5 with its input side 14 is connected on the primary side 2 to the DC voltage source 4 and with its output side 15 connected via the primary compensation device 6 to the primary transformer coil 7. On the secondary side 3, the rectifier 10 is connected with its input side 16 via the secondary compensation device 9 to the secondary transformer coil 8 and with its output side 17 to the consumer 11.

For data communication between primary side 2 and secondary side 3, in particular from the secondary side 3 to the primary side 2, the secondary compensation device 9 is configured so as to be variable. Thus, the secondary resonant frequency can be changed via the secondary compensation device 9. For this purpose, a capacitance of the secondary compensation device 9 can be changed which has a corresponding effect on the resonant frequency of the secondary resonant circuit, which is formed by the secondary transformer coil 8 and the secondary compensation device 9. The secondary side 3 is additionally equipped with a secondary communications device 18, which can comprise at least one sender or transmitter and preferentially also a receiver, so that it forms or comprises in particular a transceiver. The secondary communications device 18 is configured so that it encodes secondary-side data according to a predetermined code. For example, the secondary communications device 18 is part of a secondary-side control device, which knows for example the active current on the secondary side 3 and wishes to transmit the same to the primary side 2. The secondary communications device 18 is coupled to the secondary compensation device 9 in such a manner that the secondary communications device 18 can control the secondary compensation device 9 for changing the secondary resonant frequency. Thus, the secondary communications device 18 can control, dependent on the encoded data, the secondary communications device 9 for changing the secondary resonant frequency so that a chronological sequence of changed secondary resonant frequencies represents the encoded data. In this way, the data to be transmitted is fed as frequency modulation on the secondary side 3 into the oscillating system.

The primary side 2 comprises a primary communications device 19, which monitors a primary-side parameter that correlates to the secondary-side resonant frequency. In this way, the primary communications device 19 can recognise and decode the encoded data coupled into the oscillating system according to the code. For example, the primary communications device 19 can be coupled to a primary-side control device which then receives the decoded data and can utilise the same for controlling an overall system including the transformer device 1. Such an overall system can be for example a synchronous machine, which will still be explained in more detail further down below.

In the example shown here, the primary side 2 additionally comprises a phase measuring device 20, which on the output side 15 of the inverter 5 is coupled to current-conducting lines. The phase measuring device 20 is configured so that it determines a phase shift 21 between current and voltage on the primary side, i.e. in the primary-side alternating current or in the primary-side AC voltage. Optionally, the primary side 2 can be additionally equipped with a frequency control device 22, which is coupled to the phase measuring device 20 and to the inverter 5 and which serves for correcting the phase shift 21. For this purpose, it prompts the inverter 5 to suitably adapt its pulse modulation in order to change the frequency in the primary-side alternating current or in the primary-side AC voltage for a reduction and preferentially elimination of the phase shift 21.

The primary-side communications device 19 can now be coupled by means of a signal line 23 to the phase measuring device 20 so that the primary communications device 19 monitors the phase shift 21 as primary-side parameter which correlates to the secondary-side resonant frequency. Alternatively to this, the primary communications device 19 can be coupled by means of a signal line 24 to the frequency control device 22, so that it monitors the adjustment of the frequency in the primary-side AC voltage or in the primary-side alternating current as primary-side parameter, which correlates to the secondary-side resonant frequency. Alternatively to this, the primary communications device 19 can be coupled by means of a signal line 25 to the inverter 5 and there monitor the adjustment of the pulse modulation or the frequency in the primary-side alternating current or in the primary-side AC voltage as primary-side signal correlating to the secondary-side resonant frequency. It is likewise conceivable to equip the primary side 2 with a primary-side frequency measuring device (not shown), so that the primary-side frequency can be directly monitored as primary-side parameter correlated to the secondary resonant frequency. For determining the current profile and the voltage profile, the phase measuring device 20 is coupled to a corresponding current tap 26 and to a corresponding voltage tap 27.

In the example shown here, the secondary side 3 can comprise a secondary-side frequency detection device 28, which is coupled for example to a voltage tap 29. With the help of the secondary frequency detection device 28, the current frequency in the secondary-side AC voltage or in the secondary-side alternating current can be determined. The secondary-side frequency detection device 28 is additionally coupled to the secondary-side communications device 18.

The primary-side communications device 19 can now be configured so that it encodes primary-side data, in particular control commands, according to a predetermined code. By a suitable coupling to the inverter 25, the primary-side communications device 19 can now control the inverter 25 dependent on the encoded data for changing the pulse modulation of the inverter 5 and thus for changing the frequency of the primary-side alternating current or of the primary-side AC voltage. As a consequence, a chronological sequence of changed frequencies in the primary-side alternating current or in the primary-side AC voltage represents the encoded data. In other words, the primary-side data are modulated onto the primary-side frequency of the alternating current or of the AC voltage. By way of the transformer 12, the frequency in the secondary-side alternating current and in the secondary-side AC voltage corresponds identically to the frequency in the primary-side alternating current or in the primary-side AC voltage. This means that data modulated onto the primary-side alternating current or on the primary-side AC voltage through frequency modulation are also modulated onto the secondary-side alternating current or onto the secondary-side AC voltage. The secondary-side communications device 18, through its coupling to the secondary-side frequency detection device 28, can monitor the frequency in the secondary-side alternating current or in the secondary-side AC voltage and accordingly also identify the frequency modulation and thus detect the encoded data and decode these according to the code.

According to a preferred embodiment, the transformer device 1 introduced here can be a part of an inductively electrically excited synchronous machine 30 only shown rudimentarily here, which comprises a stator 31 with a stator control device 32 and a rotor 33 with a rotor control device 34. The rotor control device 34 is arranged on the rotor 33, so that it rotates with the rotor 33. The primary side 2 of the transformer device 1 is arranged on the stator 31 while the secondary side 3 of the transformer device 1 is arranged on the rotor 33. The primary-side communications device 19 is coupled to the stator control device 32 and the secondary-side communications device 18 is coupled to the rotor control device 34. The rotor 33 comprises a rotor coil 35 for generating a magnetic rotor field. In a simple embodiment, the transformer device 1 can serve for supplying this rotor coil 35 with electrical energy. In this case, the consumer 11 comprises the rotor coil 35.

In a preferred other embodiment, the synchronous machine 30 is equipped with a main energy supply 36, which inductively supplies the rotor coil 35 with electrical energy. In this case, the transformer device 1 then forms within the synchronous machine 30 an auxiliary energy supply device 37, which serves for supplying the rotor control device 34 with electrical energy. In this case, the consumer 11 comprises the rotor control device 34. It is clear that individual components of the transformer device 1 or of the synchronous machine 30, which are shown separately here, can be structurally integrated into one another.

The transformer device 1 introduced here makes possible carrying out a data transmission between the primary side 2 and the secondary side 3 via the transformer 12, which serves for the energy transmission from the DC voltage source 4 to the consumer 11. For this purpose, the data, which are to be transmitted from the secondary side 3 to the primary side 2, are encoded on the secondary side 3 by modulation of the secondary-side resonant frequency. Since the secondary side 3 is coupled via the transformer 12 to the primary side 2, a phase shift 21 between current and voltage is obtained on the primary side 2 in the primary-side alternating current. This phase shift 21 or a parameter correlating therewith, such as for example the primary-side adjustment of the pulse modulation of the inverter 5 or of the frequency of the primary-side alternating current or of the primary-side AC voltage forms a primary-side signal correlating to the secondary-side resonant frequency, which can be easily monitored and decoded on the primary side 2.

In the reverse case, in which data are to be transmitted from the primary side 2 to the secondary side 3, these data can be encoded on the primary side 2 by modulation of a frequency of the primary-side alternating current or of the primary-side AC voltage. Since the frequencies of the alternating currents or AC voltages on the primary side 2 and on the secondary side 3 are identical, a frequency modulation in the alternating current or in the AC voltage on the primary side 2 produces a frequency modulation identical thereto in the alternating current or in the AC voltage on the secondary side 3. Accordingly, this frequency modulation can be decoded on the secondary side by monitoring the frequency of the secondary-side alternating current or of the secondary-side 3 AC voltage.

The invention claimed is:

1. A transformer device for inductive transmission of electrical energy between a DC voltage source and a consumer, comprising:

a primary side including the DC voltage source, an inverter, a primary compensation device, and a primary transformer coil;

a secondary side including a secondary transformer coil, a secondary compensation device, a rectifier, and the consumer;

the inverter having an input side connected to the DC voltage source and having an output side connected, via the primary compensation device, to the primary transformer coil;

the rectifier having an input side connected via the secondary compensation device to the secondary transformer coil and having an output side connected to the consumer;

wherein the secondary compensation device is configured variably such that a secondary-side resonant frequency is changeable;

wherein the secondary side further includes a secondary communications device configured to encode secondary-side data according to a predetermined code, the secondary communications device coupled to the secondary compensation device and configured to control the secondary compensation device depending on the encoded data for changing the secondary-side resonant frequency such that a chronological sequence of changed secondary-side resonant frequencies represents the encoded data;

wherein the primary side further includes a primary communications device configured to monitor a primary-side parameter that correlates to the secondary-side resonant frequency, recognize the encoded data, and decode the encoded data according to the code; and wherein the secondary compensation device is configured to only change the secondary-side resonant frequency by less than 1%.

2. The transformer device according to claim 1, wherein:

the primary side further includes a phase measuring device configured to determine a phase shift between current and voltage in a primary-side alternating current and/or a primary-side AC voltage; and the primary communications device is coupled to the phase measuring device and monitors the phase shift as the primary-side parameter, which correlates to the secondary-side resonant frequency.

3. The transformer device according to claim 2, wherein the primary communications device decodes the data from the phase shift.

4. The transformer device according to claim 1, wherein:

the primary side further includes a frequency control device configured to correct a phase shift between current and voltage in a primary-side alternating current and/or a primary-side AC voltage via adjusting a frequency in the primary-side alternating current and/or the primary-side AC voltage; and the primary communications device is coupled to the frequency control device and/or the inverter and monitors an adjustment of the frequency in the primary-side alternating current and/or the primary-side AC voltage as the primary-side parameter, which correlates to the secondary-side resonant frequency.

5. The transformer device according to claim 4, wherein the primary communications device decodes the data from a chronological sequence of the adjustment of the frequency in the primary-side alternating current and/or the primary-side AC voltage.

6. The transformer device according to claim 4, wherein: the adjustment of the frequency in the primary-side AC voltage and/or the primary-side alternating current is represented by (i) control commands of the frequency control device to the inverter, (ii) a pulse modulation changed via the inverter based on the control commands, and/or (iii) a frequency in the primary-side AC voltage and/or the primary-side alternating current; and the primary communications device decodes the data from (i) a chronological sequence of the control commands of the frequency control device to the inverter, (ii) a chronological sequence of the pulse modulation of the inverter, and/or (iii) a chronological sequence of the frequency in the primary-side AC voltage and/or the primary-side alternating current.

7. The transformer device according to claim 1, wherein the secondary compensation device includes a variable capacitor.

8. The transformer device according to claim 1, wherein: the secondary compensation device includes two capacitors connected in parallel; a first capacitor of the two capacitors is activatable and de-activatable; and a second capacitor of the two capacitors is always active.

9. The transformer device according to claim 1, wherein: the code is a binary code; and the secondary compensation device is configured such that two different secondary-side resonant frequencies are adjustable.

10. The transformer device according to claim 1, wherein: the secondary side further includes a secondary-side frequency detection device configured to detect a current frequency in a secondary-side alternating current and/or a secondary-side AC voltage; the primary communications device is configured to encode primary-side data according to a predetermined code, is coupled to the inverter, and is configured to control the inverter depending on the encoded data for changing a frequency of a primary-side alternating current and/or a primary-side AC voltage such that a chronological sequence of changed frequencies in the primary-side alternating current represents the encoded data; and the secondary communications device is coupled to the secondary-side frequency detection device and is configured to monitor the frequency in the secondary-side alternating current and/or the primary-side AC voltage, recognize the encoded data, and decode the encoded data according to the code.

11. An inductively electrically excited synchronous machine, comprising: a stator including a stator control device; a rotor on which a rotor control device is arranged; and a transformer device according to claim 1; wherein the primary side of the transformer device is arranged on the stator; wherein the secondary side of the transformer device is arranged on the rotor; wherein the primary communications device is coupled to the stator control device; and wherein the secondary communications device is coupled to the rotor control device.

12. The synchronous machine according to claim 11, wherein the consumer includes a rotor coil for providing a magnetic rotor field.

13. The synchronous machine according to claim 11, further comprising a main energy supply, wherein: the rotor includes a rotor coil for providing a magnetic rotor field; the main energy supply is configured to inductively transmit electrical energy to the rotor coil; and the transformer device forms an auxiliary energy supply, which inductively transmits electrical energy to the rotor control device such that the consumer includes the rotor control device.

14. The transformer device according to claim 1, wherein the secondary-side data includes: a secondary-side current; a secondary-side voltage; and/or a temperature of a component of the secondary side.

15. A method for data transmission between a secondary side of a transformer device for inductive transmission of electrical energy from a DC voltage source to a consumer and a primary side of the transformer device, the method comprising: providing the transformer device; the primary side of the transformer device including the DC voltage source, an inverter, a primary compensation device, a primary transformer coil, and a primary communications device; the inverter having an input side connected to the DC voltage source and having an output side connected, via the primary compensation device, to the primary transformer coil; the secondary side including a secondary transformer coil, a secondary compensation device, a rectifier, the consumer, and a secondary communications device; the rectifier having an input side connected, via the secondary compensation device, to the secondary transformer coil and having an output side connected to the consumer; the secondary compensation device is configured variably such that a secondary-side resonant frequency is changeable; the secondary communications device configured to encode secondary-side data according to a predetermined code, the secondary communications device coupled to the secondary compensation device and configured to control the secondary compensation device depending on the encoded data for changing the secondary-side resonant frequency such that a chronological sequence of changed secondary-side resonant frequencies represents the encoded data; and the primary communications device configured to monitor a primary-side parameter that correlates to the secondary-side resonant frequency, recognize the encoded data, and decode the encoded data according to the code encoding the secondary-side data, which is to be transmitted from the secondary side to the primary side, on the secondary side via modulation of the secondary-side resonant frequency with the secondary compensation device; and on the primary side, monitoring and decoding the primary-side parameter that correlates to the secondary-side resonant frequency with the primary communications device; wherein modulation of the secondary-side resonant frequency includes changing the secondary-side resonant frequency by less than 1%.

16. The method according to claim 15, further comprising:

encoding data, which is to be transmitted from the primary side to the secondary side, on the primary side via modulation of a frequency of a primary-side alternating current and/or a primary-side AC voltage; and on the secondary side, monitoring and decoding a resonant frequency of a secondary-side alternating current and/or a secondary-side AC voltage.

17. The method according to claim 15, wherein:

the primary side further includes a phase measuring device configured to determine a phase shift between current and voltage in a primary-side alternating current and/or a primary-side AC voltage; and the primary communications device is coupled to the phase measuring device and monitors the phase shift as the primary-side parameter, which correlates to the secondary-side resonant frequency.

18. The method according to claim 17, further comprising decoding, via the primary communications device, the data from the phase shift.

19. The method according to claim 15, wherein:

the primary side further includes a frequency control device configured to correct a phase shift between current and voltage in a primary-side alternating current and/or a primary-side AC voltage via adjusting a frequency in the primary-side alternating current and/or the primary-side AC voltage; and the primary communications device is coupled to the frequency control device and/or the inverter and monitors an adjustment of the frequency in the primary-side alternating current and/or the primary-side AC voltage as the primary-side parameter, which correlates to the secondary-side resonant frequency.

20. The method according to claim 19, wherein the primary communications device decodes the data from a chronological sequence of the adjustment of the frequency in the primary-side alternating current and/or the primary-side AC voltage.

21. The method according to claim 19, wherein:

the adjustment of the frequency in the primary-side AC voltage and/or the primary-side alternating current is represented by (i) control commands of the frequency control device to the inverter, (ii) a pulse modulation changed via the inverter based on the control commands, and/or (iii) a frequency in the primary-side AC voltage and/or the primary-side alternating current; and the primary communications device decodes the data from (i) a chronological sequence of the control commands of the frequency control device to the inverter, (ii) a chronological sequence of the pulse modulation of the inverter, and/or (iii) a chronological sequence of the frequency in the primary-side AC voltage and/or the primary-side alternating current.

22. The method according to claim 15, wherein the secondary compensation device includes a variable capacitor.

23. The method according to claim 15, wherein:

the secondary compensation device includes two capacitors connected in parallel;

a first capacitor of the two capacitors is activatable and de-activatable; and a second capacitor of the two capacitors is always active.

24. The method according to claim 15, wherein:

the code is a binary code; and the secondary compensation device is configured such that two different secondary-side resonant frequencies are adjustable.

25. The method according to claim 15, wherein:

the secondary side further includes a secondary-side frequency detection device configured to detect a current frequency in a secondary-side alternating current and/or a secondary-side AC voltage;

the primary communications device is configured to encode primary-side data according to a predetermined code, is coupled to the inverter, and is configured to control the inverter depending on the encoded data for changing a frequency of a primary-side alternating current and/or a primary-side AC voltage such that a chronological sequence of changed frequencies in the primary-side alternating current represents the encoded data; and the secondary communications device is coupled to the secondary-side frequency detection device and is configured to monitor the frequency in the secondary-side alternating current and/or the primary-side AC voltage, recognize the encoded data, and decode the encoded data according to the code.

26. The method according to claim 15, wherein:

the transformer device forms a part of an inductively electrically excited synchronous machine;

the synchronous machine includes a stator, the stator including a stator control device;

the synchronous machine further includes a rotor on which a rotor control device is arranged;

the primary side of the transformer device is arranged on the stator;

the secondary side of the transformer device is arranged on the rotor;

the primary communications device is coupled to the stator control device; and the secondary communications device is coupled to the rotor control device.

27. The method according to claim 26, wherein the consumer includes a rotor coil for providing a magnetic rotor field.

28. The method according to claim 26, wherein:

the rotor includes a rotor coil for providing a magnetic rotor field;

the synchronous machine includes a main energy supply configured to inductively transmit electrical energy to the rotor coil; and the transformer device forms, in the synchronous machine, an auxiliary energy supply, which inductively transmits electrical energy to the rotor control device such that the consumer includes the rotor control device.

29. The method according to claim 15, wherein the secondary-side data includes:

a secondary-side current;

a secondary-side voltage; and/or a temperature of a component of the secondary side.

30. A transformer device for inductive transmission of electrical energy between a DC voltage source and a consumer, comprising:

a primary side including the DC voltage source, an inverter, a primary compensation device, and a primary transformer coil;

a secondary side including a secondary transformer coil, a secondary compensation device, a rectifier, and the consumer;

the inverter having an input side connected to the DC voltage source and having an output side connected, via the primary compensation device, to the primary transformer coil;

the rectifier having an input side connected via the secondary compensation device to the secondary transformer coil and having an output side connected to the consumer;

wherein the secondary compensation device is configured variably such that a secondary-side resonant frequency is changeable;

wherein the secondary side further includes a secondary communications device configured to encode secondary-side data according to a predetermined code, the secondary communications device coupled to the secondary compensation device and configured to control the secondary compensation device depending on the encoded secondary-side data for changing the secondary-side resonant frequency such that a chronological sequence of changed secondary-side resonant frequencies represents the encoded secondary-side data;

wherein the primary side further includes a primary communications device configured to monitor a primary-side parameter that correlates to the secondary-side resonant frequency, recognize a modulation of the primary-side parameter corresponding to the chronological sequence of changed secondary-side resonant frequencies, and decode the modulation of the primary-side parameter to obtain the secondary-side data;

wherein the primary side further includes a phase measuring device configured to determine a phase shift between current and voltage in a primary-side alternating current and/or a primary-side AC voltage; and wherein the primary communications device is coupled to the phase measuring device and monitors the phase shift as the primary-side parameter, which correlates to the secondary-side resonant frequency.

* * * * *